United States Patent
Sakurai (10) Patent No.: US 8,250,934 B2
(45) Date of Patent: Aug. 28, 2012

(54) MULTI-AXIS FORCE SENSOR AND ACCELERATION SENSOR

(75) Inventor: Nobuhiro Sakurai, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 444 days.

(21) Appl. No.: 12/702,858

(22) Filed: Feb. 9, 2010

(65) Prior Publication Data

US 2010/0199783 A1    Aug. 12, 2010

(30) Foreign Application Priority Data

Feb. 10, 2009 (JP) ................. 2009-029110

(51) Int. Cl.
G01L 1/22 (2006.01)
(52) U.S. Cl. ............... 73/862.044; 73/862.041
(58) Field of Classification Search ......... 73/862.041–862.045, 764; 29/621.1, 29/610.1, 592.1
See application file for complete search history.

(56) References Cited

U.S. PATENT DOCUMENTS

| | | | | |
|---|---|---|---|---|
| 3,985,025 A * | 10/1976 | Ormond | ..................... | 177/255 |
| 4,454,771 A * | 6/1984 | Shimazoe et al. | ........ | 73/862.68 |
| 4,905,523 A * | 3/1990 | Okada | ..................... | 73/862.044 |
| 5,095,762 A * | 3/1992 | Holm-Kennedy et al. | ........................ | 73/862.041 |
| 5,437,196 A * | 8/1995 | Okada | ..................... | 73/862.043 |
| 6,742,390 B2 * | 6/2004 | Mochida et al. | ............ | 73/504.14 |
| 6,823,744 B2 * | 11/2004 | Ohsato et al. | ............ | 73/862.041 |
| 6,951,142 B2 * | 10/2005 | Ohsato et al. | ............ | 73/862.041 |
| 7,360,456 B2 * | 4/2008 | Morimoto | ................ | 73/862.044 |
| 7,367,232 B2 * | 5/2008 | Vaganov et al. | ........... | 73/514.33 |
| 7,458,281 B2 * | 12/2008 | Ohsato et al. | ............ | 73/862.044 |
| 7,490,524 B2 * | 2/2009 | Ohsato et al. | ............ | 73/862.629 |
| 7,536,922 B2 * | 5/2009 | Sakurai et al. | ........... | 73/862.041 |
| 7,536,923 B2 * | 5/2009 | Hirabayashi et al. | .... | 73/862.044 |
| 7,594,445 B2 * | 9/2009 | Hirabayashi et al. | .... | 73/862.044 |
| 7,637,174 B2 * | 12/2009 | Hirabayashi | ............ | 73/862.041 |
| 7,703,340 B2 * | 4/2010 | Sakurai et al. | ........... | 73/862.044 |
| 7,707,899 B2 * | 5/2010 | Sakurai et al. | ........... | 73/862.044 |
| 7,757,571 B2 * | 7/2010 | Hirabayashi et al. | .... | 73/862.626 |
| 7,882,740 B2 * | 2/2011 | Okada | ............................. | 73/511 |
| 2003/0140713 A1 * | 7/2003 | Ohsato et al. | ............ | 73/862.041 |
| 2004/0164753 A1 * | 8/2004 | Hettori et al. | ................ | 324/725 |
| 2004/0255697 A1 * | 12/2004 | Okada | ..................... | 73/862.043 |
| 2005/0081645 A1 * | 4/2005 | Ohsato et al. | ............ | 73/862.041 |
| 2006/0086190 A1 * | 4/2006 | Ohsato et al. | .................. | 73/764 |

(Continued)

FOREIGN PATENT DOCUMENTS

JP     09-232595 A     9/1997

(Continued)

*Primary Examiner* — Lisa Caputo
*Assistant Examiner* — Jonathan Dunlap
(74) *Attorney, Agent, or Firm* — Squire Sanders (US) LLP (57) ABSTRACT

There is provided a multi-axis force sensor including first and second bridge circuit groups detecting resistances of respective first and second groups of strain resistance elements provided at respective strain producing portions. The strain producing portions are formed on two axes intersecting with respect to each other at a right angle. The first group of strain resistance elements are arranged on one axis across an action portion so as to face with respect to each other, and the second group of strain resistance elements are arranged on another axis across the action portion so as to face with respect to each other. The first bridge circuit groups respectively output a positive voltage when receiving tensile force, and the second bridge circuit groups respectively output a negative voltage when receiving tensile force.

4 Claims, 6 Drawing Sheets

U.S. PATENT DOCUMENTS

| | | | |
|---|---|---|---|
| 2006/0174718 A1* | 8/2006 | Morimoto | 73/862.044 |
| 2007/0000335 A1* | 1/2007 | Morimoto | 73/862.045 |
| 2007/0006668 A1* | 1/2007 | Hirabayashi et al. | 73/862.541 |
| 2007/0266797 A1* | 11/2007 | Hirabayashi et al. | 73/862.044 |
| 2008/0034897 A1* | 2/2008 | Ohsato et al. | 73/862.629 |
| 2008/0047366 A1* | 2/2008 | Kuriyama et al. | 73/862.627 |
| 2008/0053247 A1* | 3/2008 | Sakurai et al. | 73/862.041 |
| 2008/0066562 A1* | 3/2008 | Sakurai et al. | 73/862.044 |
| 2008/0156112 A1* | 7/2008 | Sakurai et al. | 73/862.474 |
| 2008/0178688 A1* | 7/2008 | Hirabayashi | 73/862.041 |
| 2008/0282813 A1* | 11/2008 | Hirabayashi et al. | 73/862.626 |
| 2009/0301226 A1* | 12/2009 | Hirabayashi et al. | 73/862.626 |
| 2009/0320610 A1* | 12/2009 | Ohsato et al. | 73/862.043 |
| 2010/0011885 A1* | 1/2010 | Ohsato et al. | 73/862.627 |
| 2011/0023630 A1* | 2/2011 | Zandman et al. | 73/862.623 |

FOREIGN PATENT DOCUMENTS

JP     2001-264198 A     9/2001

* cited by examiner

P-TYPE SEMICONDUCTOR SUBSTRATE

| | | Fx | Fy | -Fz | Mx | My | Mz |
|---|---|---|---|---|---|---|---|
| FIRST GROUP OF STRAIN DETECTING RESISTIVE MEMBERS | TENSILE → POSITIVE VOLTAGE | | | | | | |
| | Sp1 | COMPRESSIVE (NEGATIVE VOLTAGE) | COMPRESSIVE (NEGATIVE VOLTAGE) | TENSILE (POSITIVE VOLTAGE) | COMPRESSIVE (POSITIVE VOLTAGE) | COMPRESSIVE (POSITIVE VOLTAGE) | COMPRESSIVE (POSITIVE VOLTAGE) |
| | Sp2 | COMPRESSIVE (NEGATIVE VOLTAGE) | TENSILE (POSITIVE VOLTAGE) | TENSILE (POSITIVE VOLTAGE) | TENSILE (NEGATIVE VOLTAGE) | COMPRESSIVE (POSITIVE VOLTAGE) | TENSILE (NEGATIVE VOLTAGE) |
| | COMPRESSIVE → NEGATIVE VOLTAGE | | | | | | |
| | Sp3 | TENSILE (POSITIVE VOLTAGE) | TENSILE (POSITIVE VOLTAGE) | TENSILE (POSITIVE VOLTAGE) | TENSILE (NEGATIVE VOLTAGE) | TENSILE (NEGATIVE VOLTAGE) | COMPRESSIVE (POSITIVE VOLTAGE) |
| | Sp4 | TENSILE (POSITIVE VOLTAGE) | COMPRESSIVE (NEGATIVE VOLTAGE) | TENSILE (POSITIVE VOLTAGE) | COMPRESSIVE (POSITIVE VOLTAGE) | TENSILE (NEGATIVE VOLTAGE) | TENSILE (NEGATIVE VOLTAGE) |
| SECOND GROUP OF STRAIN DETECTING RESISTIVE MEMBERS | TENSILE → NEGATIVE VOLTAGE | | | | | | |
| | Sn1 | TENSILE (NEGATIVE VOLTAGE) | COMPRESSIVE (POSITIVE VOLTAGE) | TENSILE (NEGATIVE VOLTAGE) | COMPRESSIVE (NEGATIVE VOLTAGE) | COMPRESSIVE (NEGATIVE VOLTAGE) | TENSILE (NEGATIVE VOLTAGE) |
| | Sn2 | COMPRESSIVE (POSITIVE VOLTAGE) | COMPRESSIVE (POSITIVE VOLTAGE) | TENSILE (NEGATIVE VOLTAGE) | COMPRESSIVE (NEGATIVE VOLTAGE) | TENSILE (POSITIVE VOLTAGE) | COMPRESSIVE (POSITIVE VOLTAGE) |
| | COMPRESSIVE → POSITIVE VOLTAGE | | | | | | |
| | Sn3 | COMPRESSIVE (POSITIVE VOLTAGE) | TENSILE (NEGATIVE VOLTAGE) | TENSILE (NEGATIVE VOLTAGE) | TENSILE (POSITIVE VOLTAGE) | TENSILE (POSITIVE VOLTAGE) | TENSILE (NEGATIVE VOLTAGE) |
| | Sn4 | TENSILE (NEGATIVE VOLTAGE) | TENSILE (NEGATIVE VOLTAGE) | TENSILE (NEGATIVE VOLTAGE) | TENSILE (NEGATIVE VOLTAGE) | COMPRESSIVE (NEGATIVE VOLTAGE) | COMPRESSIVE (POSITIVE VOLTAGE) |

MULTI-AXIS FORCE SENSOR AND ACCELERATION SENSOR

CROSS REFERENCE TO RELATED APPLICATION

The present application claims benefit of the filing date of Japanese Patent Application No. 2009-029110 filed on Feb. 10, 2009 which is incorporated herein by reference.

BACKGROUND OF THE INVENTION

1. Field of the Invention

The present invention relates to a multi-axis force sensor and an acceleration sensor, and more specifically, to a multi-axis force sensor and an acceleration sensor which cancel noise of a force component in a Z-axis direction.

2. Description of the Related Art

Conventionally, in the field of pressure sensors, there are known pressure sensors having a semiconductor strain gauge (a diffusion gauge) formed on a surface of a diaphragm that is formed on a silicon substrate (see, for example, JP 09-232595 A). In such pressure sensors, four diffusion gauges configure one bridge circuit, and change respective resistances in a positive/negative direction relative to tensile stress. For this reason, it is possible for such sensors to make the absolute values of changes in resistances equal so as to obtain a good linearity of a detection output.

In the field of multi-axis force sensors which detect forces, there are also known sensors having a beam structure formed on a semiconductor substrate and having a strain detecting element formed on the beam to detect axial force and couple of forces (see, for example, JP 2001-264198 A). Such multi-axis force sensors are configured by a plurality of pairs of bridge circuits in order to detect not only force in one-axis direction but also forces in multi-axis directions.

SUMMARY OF THE INVENTION

In the conventional multi-axis force sensors, however, regarding a force component Fz in a Z-axis direction, because noise components (common-mode noises) contained in a plurality of strain detecting elements are all superimposed and calculated, the detection precision is adversely affected.

The present invention has been made in view of the foregoing circumstance, and an object of the present invention is to provide a multi-axis force sensor and an acceleration sensor which cancel noise of a force component in the Z-axis direction and which can improve the detection precision.

In order to achieve the above object, a first aspect of the present invention provides a multi-axis force sensor including: an action portion to which external force is applied; a support portion which supports the action portion; a connection portion which connects the support portion to the action portion; strain producing portions which are formed at the connection portion and which produce strain originating from the external force; a first group of strain resistance elements and a second group of strain resistance elements provided at the respective strain producing portions; first bridge circuit groups which detect respective resistances of the first group of strain resistance elements and second bridge circuit groups which detect respective resistances of the second group of strain resistance elements, in which the strain producing portions are formed on two axes intersecting at right angle on the same plane, the first group of strain resistance elements are provided on one axis across the action portion so as to face with respect to each other, the second group of strain resistance elements are provided on another axis across the action portion so as to face with respect to each other, the first bridge circuit groups output a positive voltage respectively when the first group of strain resistance elements receive tensile force originating from the external force and output a negative voltage when the first group of strain resistance elements receive compressive force, and the second bridge circuit group output a negative voltage respectively when the second group of strain resistance elements receive tensile force and output a positive voltage when the second group of strain resistance elements receive compressive force.

According to the first aspect of the present invention, the first bridge circuit groups output the positive voltage respectively when the first group of strain resistance elements receive the tensile force originating from the external force, and the second bridge circuit groups output the negative voltage respectively when the second group of strain resistance elements receive the tensile force originating from the external force, so that the output of the first group of strain resistance elements has a reversed polarity from that of the second group of strain resistance elements. As a result, like the force component Fz in the Z-axis direction (direction in which the external force acts), because the first group of strain resistance elements and the second group of strain resistance elements output positive and negative voltages reversed with respect to each other respectively even if both first and second groups of strain resistance elements receive tensile force or compressive force, noises (common-mode noises) caused by the first group of strain resistance elements and noises caused by the second group of strain resistance elements are canceled by each other.

For this reason, calculation can be carried out in such a way that noises for all force components including force components in X-axis and Y-axis directions (directions along a plane orthogonal to a direction of the external force) are canceled, thereby improving the detection precision.

A second aspect of the present invention provides the multi-axis force sensor of the first aspect of the present invention, in which the first group of strain resistance elements include a p-type semiconductor strain gauge respectively, and the second group of strain resistance elements include a n-type semiconductor strain gauge respectively.

According to the second aspect of the present invention, as the first group of strain resistance elements are composed of the p-type semiconductor strain gauge respectively and the second group of strain resistance elements are composed of the n-type semiconductor strain gauge respectively, the first group of strain resistance elements and the second group of strain resistance elements output positive and negative voltages reversed with respect to each other, respectively. Therefore, calculation can be carried out in such a way that noises caused by the first group of strain resistance elements and noises caused by the second group of strain resistance elements are canceled by each other with a simple configuration.

A third aspect of the present invention provides the multi-axis force sensor of the first aspect of the present invention, in which the first group of strain resistance elements are built in ground sides of the first bridge circuit groups respectively, and the second group of strain resistance elements are built in voltage-input sides of the second bridge circuit groups respectively.

According to the third aspect of the present invention, a bridge circuit is configured by combining half-bridge circuits of the voltage input side and half-bridge circuits of the ground side, the first group of strain resistance elements are built in the ground side of the first bridge circuit groups, the second group of strain resistance elements are built in voltage-input sides of the second bridge circuit groups, and the first group of strain resistance elements and the second group of strain resistance elements output positive and negative voltages reversed with respect to each other, respectively. For this reason, noises caused by the first group of strain resistance elements and noises caused by the second group of strain resistance elements can be canceled by each other with a simple configuration.

A forth aspect of the present invention provides an acceleration sensor including: an action portion having a weight with a mass; a frame which is fixed to an external structural body and supports the weight; a connection portion which connects the action portion to the frame; strain-generating portions which are formed at the connection portions and produce deformation originating from displacement of the weight; a first group of strain resistance elements and a second group of strain resistance elements all of which are provided at the strain-generating portion; and first bridge circuit groups which detect respective resistances of the first group of strain resistance elements and second bridge circuit groups which detect respective resistances of the second group of strain resistance elements, in which the strain-generating portions are formed on two axes intersecting at right angle on the same plane, the first group of strain resistance elements are provided on one axis across the action portion so as to face with respect to each other, the second group of strain resistance elements are provided on another axis across the action portion so as to face with respect to each other, the first bridge circuit groups output a positive voltage respectively when the first group of strain resistance elements receive tensile force originating from the external force and output a negative voltage when the first group of strain resistance elements receive compressive force, and the second bridge circuit group output a negative voltage respectively when the second group of strain resistance elements receive tensile force and output a positive voltage when the second group of strain resistance elements receive compressive force.

According to the fourth aspect of the present invention, for the force component Fz in the Z-axis direction, calculation can be carried out in such a way that noises (common-mode noises) can be canceled with respect to each other at the first and second groups of strain resistance elements so as to reduce noises. For this reason, calculation can be carried out in such a way that noises for all force components are canceled, thereby improving the detection precision.

BRIEF DESCRIPTION OF THE DRAWINGS

FIGS. 2A to 2C are diagrams showing a structure of a semiconductor element in a multi-axis force sensor according to a first embodiment of the present invention, where

DETAILED DESCRIPTION OF THE PREFERRED EMBODIMENTS

Figure 1A:
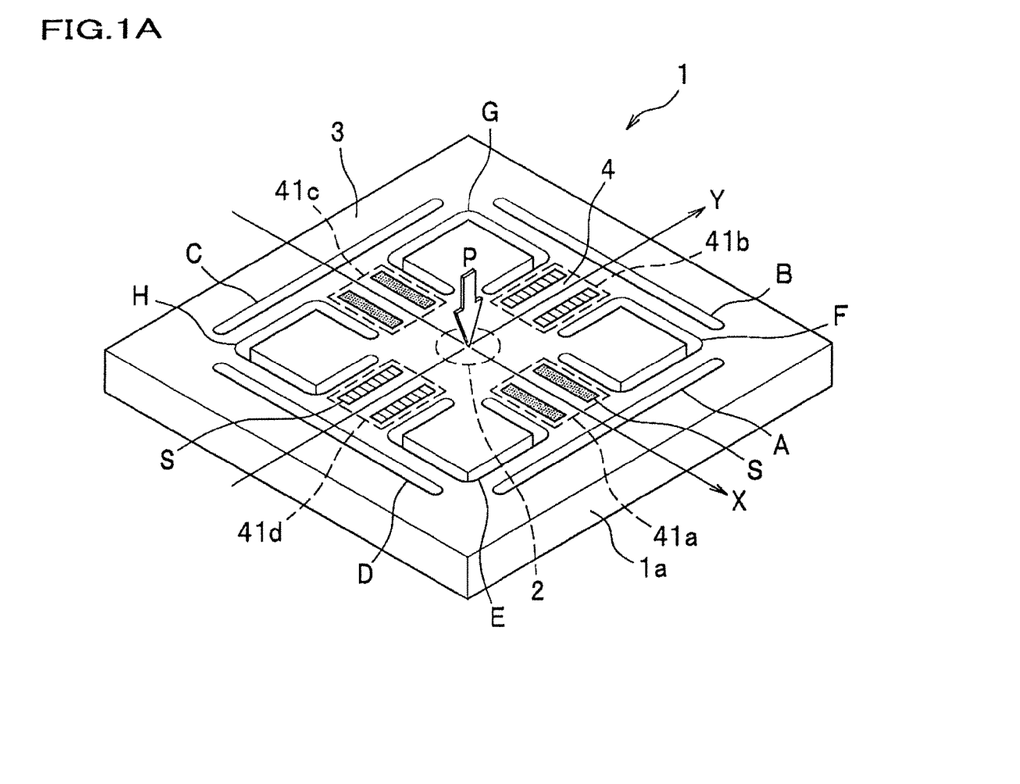
FIG. 1A is a perspective view showing a schematic structure of a multi-axis force sensor according to an embodiment of the present invention.
Figure 1B:
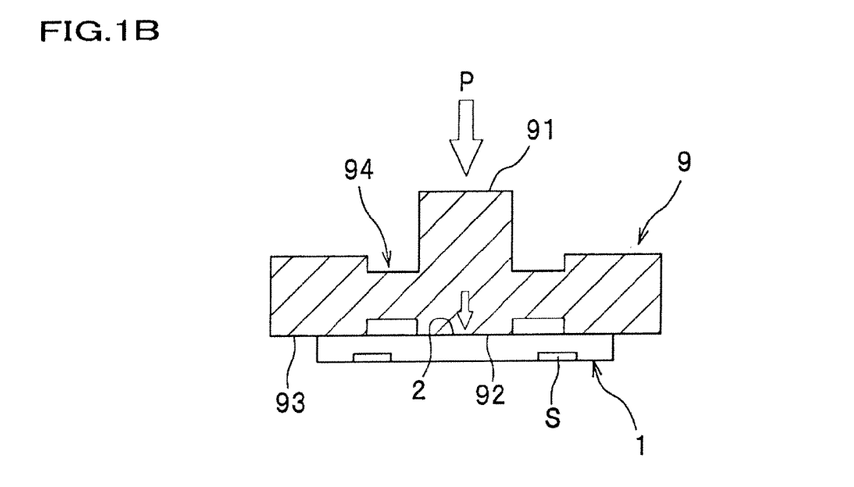
FIG. 1B is a cross-sectional view showing a structure in which the multi-axis force sensor of the present invention is fixed to an external structural body.
Figure 2A:
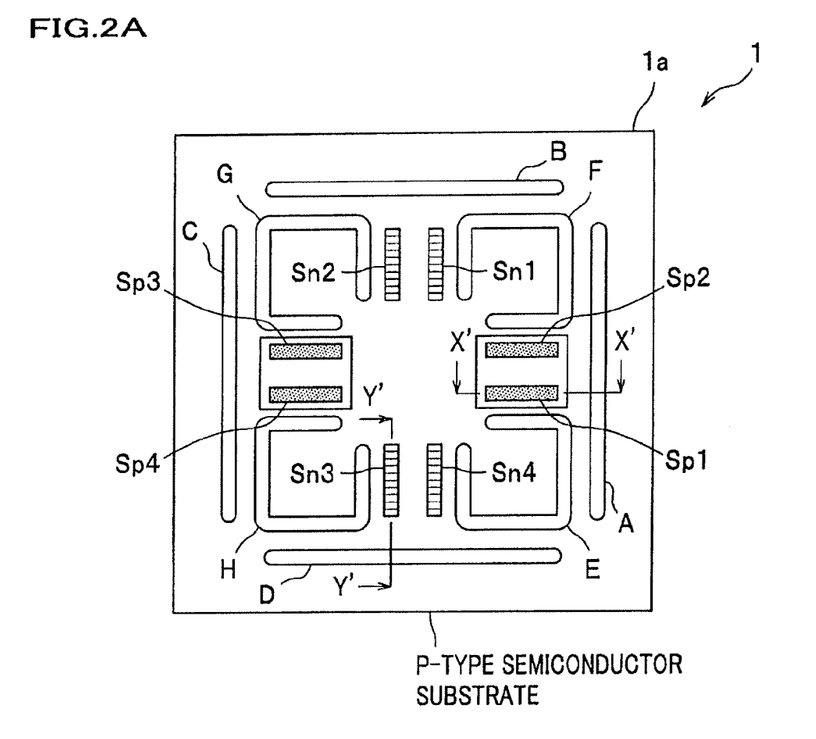
FIG. 2A is a plan view.
Figures 2B, 2C:
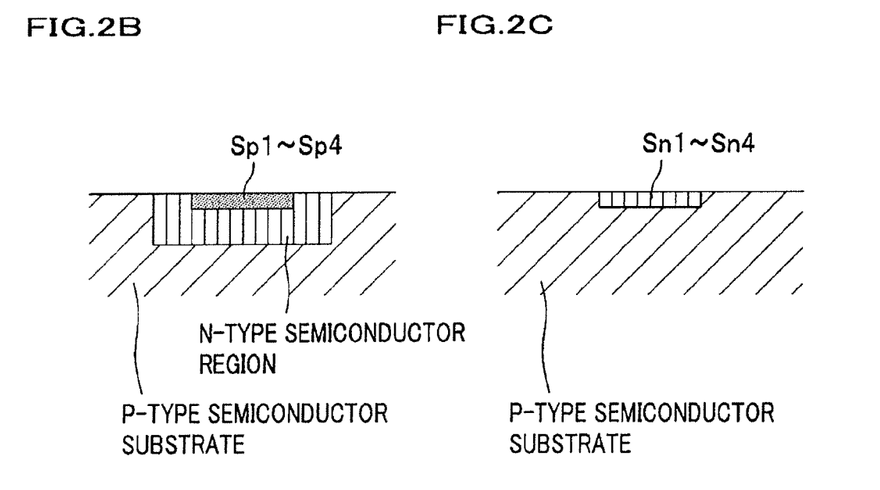
FIG. 2B is a cross-sectional view showing a structure of a p-type semiconductor element taken along the line X'-X' of FIG. 2A.
FIG. 2C is a cross-sectional view showing a structure of a n-type semiconductor element taken along the line Y'-Y' of FIG. 2A.
Figure 3A:
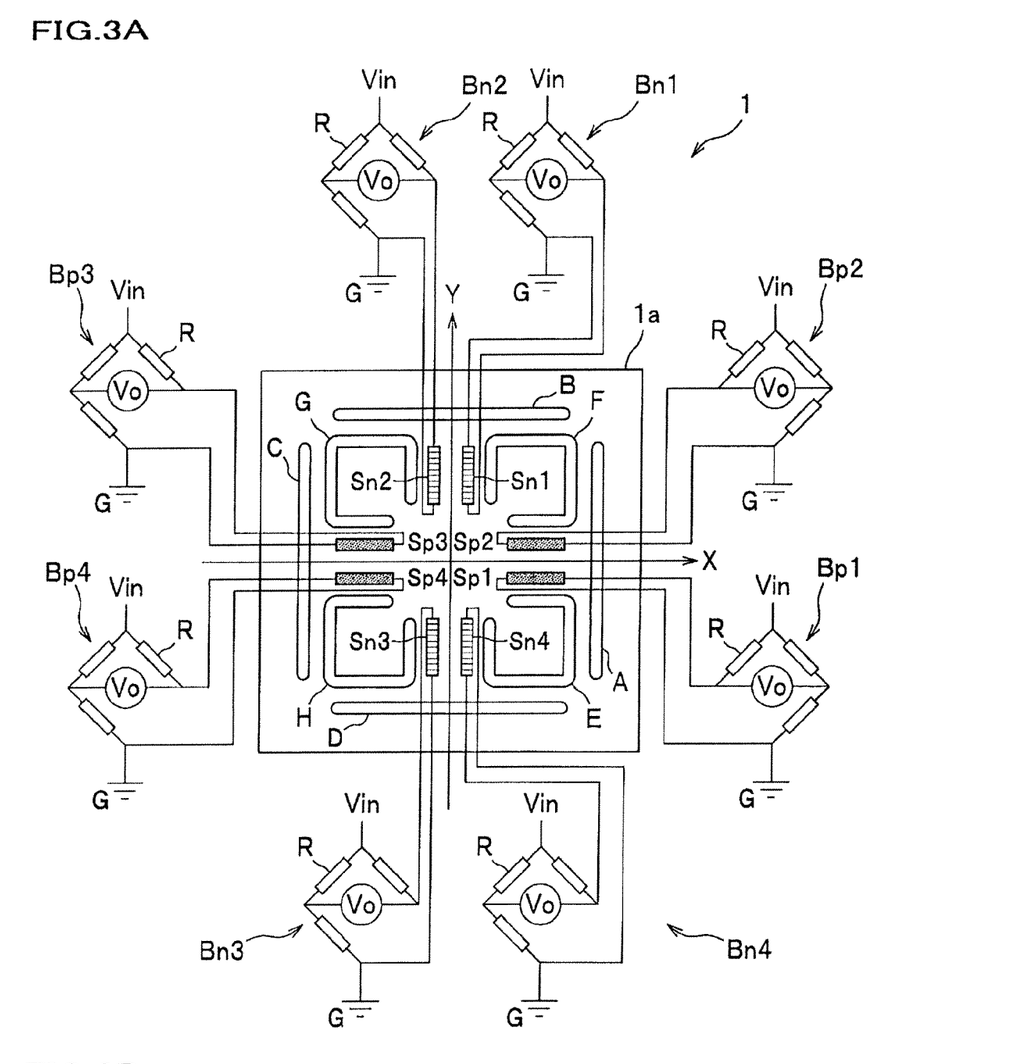
FIG. 3A is a plan view exemplary showing a relation between a strain resistance element and a bridge circuit in the multi-axis force sensor according to the first embodiment.
Figure 3B:
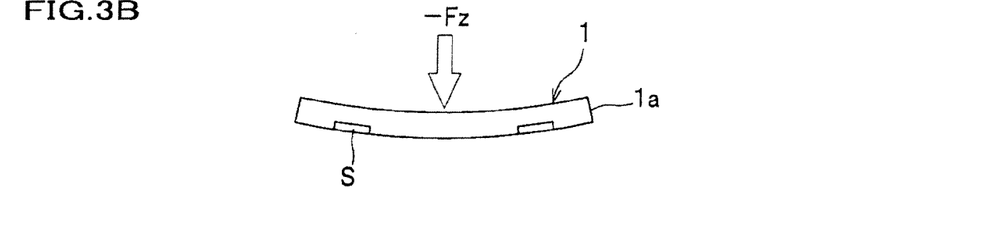
FIG. 3B is a cross-sectional view exemplary showing a state of the strain resistance element when a force component Fz in a Z-axis direction is applied thereto.

With reference to FIGS. 1-3, an overall structure of a multi-axis force sensor 1 according to an embodiment of the present invention will be explained in detail. In addition, the accompanying drawings exemplary show main structural elements for convenience of the explanation, and illustration of additional structural elements, such as a wiring, and an electrode, are omitted in the drawings.

As shown in FIGS. 1A and 2A, the multi-axis force sensor 1 according to the first embodiment of the present invention includes an action portion 2 which is formed on a semiconductor substrate 1a having a substantially-rectangular and flat shape in a planar view, and to which external force P is applied, a support portion 3 which supports the action portion 2, connection portions 4 which connect the support portion 3 to the action portion 2, and strain producing portions 41 which are formed at respective support portions 3 and generate a strain originating from the external force P.

As shown in FIG. 1A, an explanation will be given of an example in which the multi-axis force sensor 1 is a six-axis type so as to be able to detect force components of the external force P and moment components thereof along six axes. More specifically, it is supposed that force components in a X-axis direction, a Y-axis direction, and a Z-axis direction all intersecting one another at a right angle are Fx, Fy, and Fz, respectively. Moreover, it is supposed that moment components in the X-axis direction, the Y-axis direction, and the Z-axis direction are Mx, My, and Mz, respectively.

As shown in FIG. 3A, the multi-axis force sensor 1 further includes a first group of strain resistance elements Sp1-Sp4 and a second group of strain resistance elements Sn1-Sn4 provided at respective strain producing portions 41, a first bridge circuit groups Bp1-Bp4 which detect the resistances of respective first group of strain resistance elements Sp1-Sp4, and a second bridge circuit groups Bn1-Bn4 which detect the resistances of respective second group of strain resistance elements Sn1-Sn4.

Also, the first group of strain resistance elements Sp1-Sp4 are composed of a p-type semiconductor element respectively, and the second group of strain resistance elements Sn1-Sn4 are composed of an n-type semiconductor element respectively.

As shown in FIG. 1B, the multi-axis force sensor 1 is attached to an attenuator 9 which is an external member, and detects six-axis components of the external force P.

The attenuator 9 includes an input unit 91 to which the external force P is input, a transmission unit 92 which attenuates and transmits the external force P applied to the input unit 91 to the action portion 2, a fixing unit 93 which fixes the multi-axis force sensor 1, and an attenuation unit 94 which connects the fixing unit 93 to the input unit 91.

In the multi-axis force sensor 1, as shown in FIG. 1A, the action portion 2 is provided at the center of the multi-axis force sensor 1, and external force having undergone attenuation is applied to the action portion 2 from the transmission unit 92 of the attenuator 9 (see FIG. 1B).

According to such a structure, even if excessive external force P beyond the proof stress of the multi-axis force sensor 1 is applied, force having undergone attenuation appropriately is applied to the action portion 2, so that it is possible to detect the external force P highly precisely in a balanced manner.

As shown in FIG. 1A, the connection portion 4 is an area which connects the action portion 2 to the support portion 3. Elongated slit-like through holes A-D and E-H are formed at respective predetermined positions. The connection portions 4 are provided with respective strain producing portions 41a, 41b, 41c, and 41d to which tensile force or compressive force originating from a strain produced by the external force P is applied.

The strain producing portions 41 are formed on two axes (X-axis, and Y-axis) intersecting at right angle with respect to each other on the same plane of the multi-axis force sensor 1. The strain producing portions 41a, 41c are provided on the X-axis across the action portion 2, and the strain producing portions 41b, 41d are provided on the Y-axis across the action portion 2.

Also, as shown in FIG. 1A, the strain producing portions 41a, 41c formed on the X-axis have a first group of strain resistance elements S (p-type semiconductor elements, Sp1-Sp4) arranged along the X-axis (see FIG. 3A). More specifically, the strain producing portion 41a has the strain resistance elements Sp1, Sp2 arranged across the X-axis in a direction parallel to the X-axis, and the strain producing portion 41c has the strain resistance elements Sp3, Sp4 arranged across the X-axis in a direction parallel to the X-axis.

On the other hand, the strain producing portions 41b, 41d formed on the Y-axis have a second group of strain resistance elements S (n-type semiconductor elements, Sn1-Sn4) arranged along the Y-axis (see FIG. 3A). More specifically, the strain producing portion 41b has the strain resistance elements Sn1, Sn2 arranged across the Y-axis in a direction parallel to the Y-axis, and the strain producing portion 41d has the strain resistance elements Sn3, Sn4 arranged across the Y-axis in a direction parallel to the Y-axis.

In addition, in this embodiment, the p-type semiconductor elements are arranged on the X-axis, and the n-type semiconductor elements are arranged on the Y-axis. The present invention is, however, not limited to this configuration, and the n-type semiconductor elements may be arranged on the X-axis, and the p-type semiconductor elements may be arranged on the Y-axis. Moreover, the two strain resistance elements S are formed across the X-axis or the Y-axis for each of the four strain producing portions 41a, 41b, 41c, and 41d. However, the number of the strain resistance elements for each strain producing portion is not limited to the foregoing number, and may be three. In fact, the arrangement of the strain resistance element is not limited to any particular one.

As shown in FIG. 1A, the support portion 3 is located around the peripheral edge of the multi-axis force sensor 1, is a part outwardly of the straight through holes A-D formed on respective connection portions 4, and is entirely or partially fixed to the fixing unit 93 of the attenuator 9 (see FIG. 1B).

As shown in FIG. 1A, the strain resistance elements S (Sp1-Sp4, and Sn1-Sn4) are rectangular shape active layers (diffusion layers) formed on a surface (top layer part) of the semiconductor substrate 1a. Although not shown in the drawing, a resistance of the strain resistance element is changed when the external force P is applied in the longitudinal direction and the strain resistance element S is deformed.

More specifically, the p-type semiconductor element S (Sp1-Sp4) has a physical characteristic of increasing its resistance when tensile force is applied thereto and of outputting a positive voltage, and of decreasing its resistance when compressive force is applied and of outputting a negative voltage. In contrast, the n-type semiconductor element S (Sn1-Sn4) has a physical characteristic of decreasing its resistance when tensile force is applied thereto and of outputting a negative voltage, and of increasing its resistance when compressive force is applied and of outputting a positive voltage.

As explained above, the first group of strain resistance elements Sp1-Sp4 each including the p-type semiconductor element S (Sp1-Sp4) has a reversed polarity from that of the second group of strain resistance elements Sn1-Sn4 each including the n-type semiconductor element S (Sn1-Sn4) when the tensile or compressive force is applied.

With reference to FIG. 2, an explanation will be given of an embodiment in which a base member is made of a p-type semiconductor substrate.

In this embodiment, as shown in FIG. 2C, a n-type semiconductor element is formed on the p-type semiconductor substrate. Also, as shown in FIG. 2B, a p-type semiconductor element is formed at a surface area of a n-type semiconductor region formed on the p-type semiconductor substrate. In this embodiment, a bias voltage is applied so as to be a reverse bias for a pn junction between each semiconductor element and a base therebelow. That is, when a GND potential and a drive voltage Vd are applied to each element, bias voltage is applied in such a way that the p-type semiconductor substrate side has a potential lower than or equal to GND for the n-type semiconductor element, and a n-well (n-type semiconductor region) has a potential higher than or equal to the drive voltage of the p-type semiconductor element for the p-type semiconductor element. By applying such a bias voltage, the potential at a substrate side relative to each semiconductor element is stabilized, thereby stabilizing a device operation. For this reason, it becomes possible to obtain a stable sensor output.

The first bridge circuit groups Bp1-Bp4 and the second bridge circuit groups Bn1-Bn4 are composed of the same bridge circuit.

More specifically, the first bridge circuit groups Bp1-Bp4 and second bridge circuit groups Bn1-Bn4 are composed of a half bridge at a voltage input (Vin) side and a half bridge at a ground (G) side. The strain resistance elements Sp1-Sp4, and Sn1-Sn4 are built in the half bridges at the ground (G) side respectively.

In addition, in this embodiment, although each strain resistance element Sp1-Sp4, Sn1-Sn4 is built in the half bridge at the ground (G) side, the present invention is not limited to this configuration. For example, each strain resistance element Sp1-Sp4, Sn1-Sn4 may be built in the half bridge at the voltage input (Vin) side.

According to such a structure, the first bridge circuit groups Bp1-Bp4 detect respective output voltages Vo to obtain respective resistances of the first group of strain resistance elements Sp1-Sp4, and the second bridge circuit groups Bn1-Bn4 detect respective output voltages Vo to obtain respective resistances of the second group of strain resistance elements Sn1-Sn4.

The through holes A-D and E-H are combinations of the straight through holes A, B, C, and D, and through holes E, F, G, H bent like a hook at right angle. The right-angle portions of the through holes E, F, G, and H are formed at respective four corners of a square in such a way as to be a substantial square as a whole around the action portion 2.

Also, the through holes E-H are arranged in such a way that the strain producing portion 41a is formed between the through holes E and F, the strain producing portion 41b is formed between the through holes F and G, the strain producing portion 41c is formed between the through holes G and H, and the strain producing portion 41d is formed between the through holes H and E.

By providing the through holes E-H in this fashion, the internal (the action portion side) edges adjoining to the through holes E-H can move freely without any stress, and function as free ends to which no tensile force or compressive force originating from the external force P (see FIG. 1A) is applied even if the external force P is applied to the action portion 2.

In contrast, tensile force or compressive force is applied to the strain producing portions 41 (41a, 41b, 41c, and 41d).

In addition, in this embodiment, although the straight through holes A-E and the hook-like through holes E-H are formed and arranged in a substantially-square shape, and the strain resistance elements S are arranged in consideration of strain produced by the through holes A-D and E-H, the present invention is not limited to this configuration. For example, the through holes A-D and E-H may be formed in other shapes like a circular shape in consideration of axial force and moment to be detected.

Figure 4:
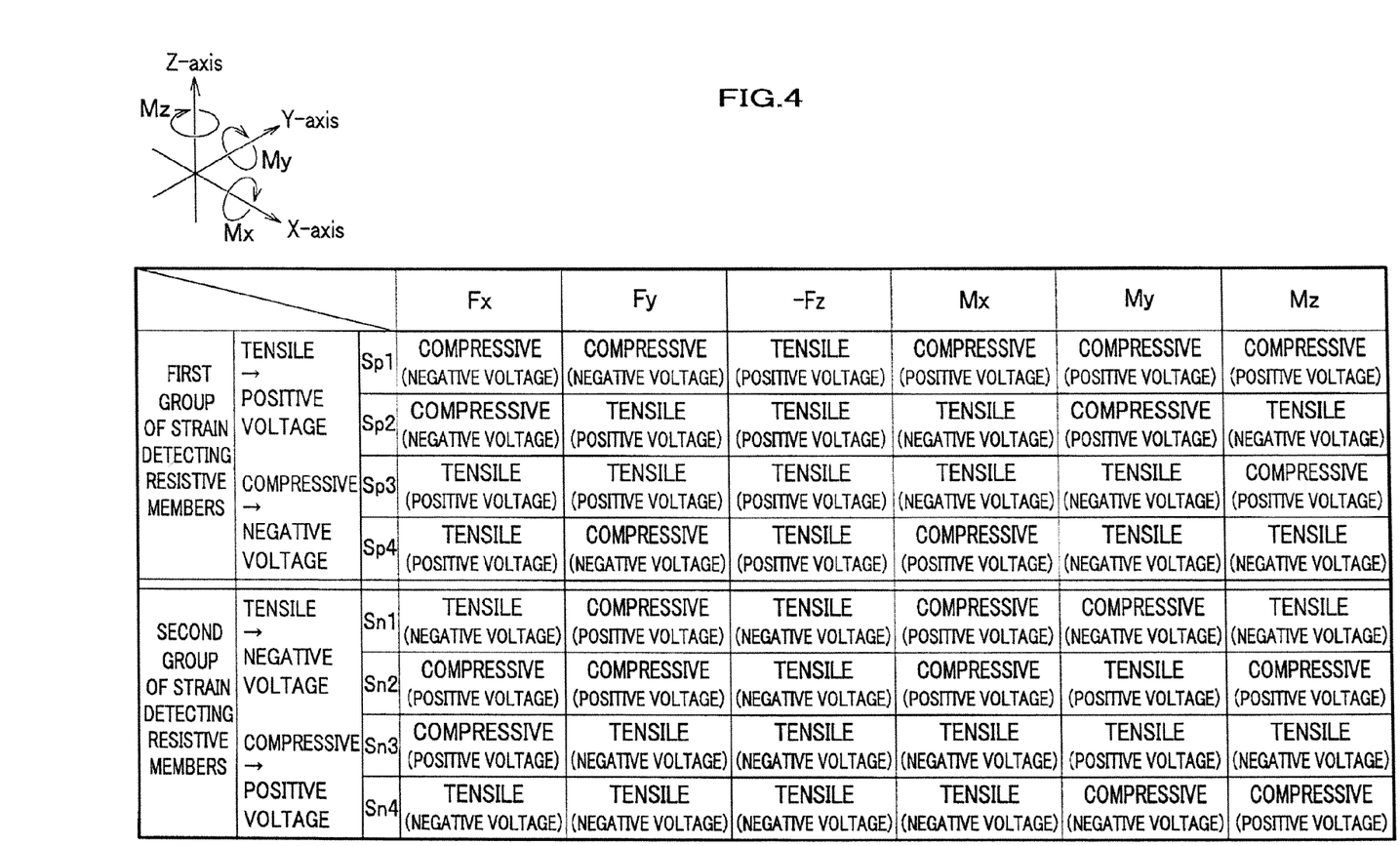
FIG. 4 is a table showing a relation between a state of a strain of the strain resistance element in the multi-axis force sensor according to the first embodiment and an output voltage.

Next, with reference to FIG. 4, an operation of the multi-axis force sensor 1 according to the first embodiment will be explained. FIG. 4 shows a state of strain (compression or tension) of each strain resistance element Sp1-Sp4, Sn1-Sn4 in the multi-axis force sensor 1 according to the first embodiment caused by six-axis components contained in the external force P, and an output voltage V0.

When the external force P containing various kinds of axial components is applied to the attenuator 9 (see FIG. 1A), the external force P is attenuated at a predetermined rate, and force having undergone attenuation is transmitted to the multi-axis force sensor 1.

Also, as shown in FIG. 4, when the external force P containing six-axis components is input to the action portion 2 of the multi-axis force sensor 1, respective strain resistance elements Sp1-Sp4, Sn1-Sn4 receive tensile force or compressive force, and change their resistances. The change in the resistance is detected as a positive or negative output voltage V0 by each of the first and second bridge circuit groups Bp1-Bp4, Bn1-Bn4.

In this way, the detected output voltage V0 is applied to a well-known predetermined equation, and six-axis components in the external force P are obtained (see, for example, JP 2003-207405 A, paragraph 0070).

As shown in FIG. 4, a force component Fz in the Z-axis direction applies tensile or compressive force in the same way to each strain resistance element Sp1-Sp4, Sn1-Sn4 (in the case of –Fz, tensile force is applied to all, see FIG. 3B).

Therefore, like the prior art, when the polarity of the first group of strain resistance elements Sp1-Sp4 is not reversed to that of the second group of strain resistance elements Sn1-Sn4, calculation is carried out with all signals being as positive voltages of the same sign (in the case of –Fz, tensile force is applied to all), all common-mode noises are superimposed, and the detection precision is adversely affected.

Therefore, in the multi-axis force sensor 1 according to the embodiment of the present invention, even if all of the first and second groups of strain resistance elements Sp1-Sp4 and Sn1-Sn4 receive tensile force, the first bridge circuit groups Bp1-Bp4 output a positive voltage when the first group of respective strain resistance elements Sp1-Sp4 receive tensile force caused by the external force P, and the second bridge circuit groups Bn1-Bn4 output a negative voltage when the second group of respective strain resistance elements Sn1-Sn4 receive tensile force caused by the external force P.

As explained above, as the first group of strain resistance elements Sp1-Sp4 has a reversed polarity from that of the second group of strain resistance elements Sn1-Sn4, noises (common-mode noises) caused by the fist group of strain resistance elements Sp1-Sp4 and noises caused by the second group of strain resistance elements Sn1-Sn4 are canceled by each other with respect to the force component Fz in the Z-axis direction.

In this case, as shown in FIG. 4, regarding five-axis components other than the force component Fz in the Z-axis direction, the number of strain resistance elements receiving tensile force and the number of those receiving compressive force are half and half in the first group of strain resistance elements Sp1-Sp4 and in the second group of strain resistance elements Sn1-Sn4, so that common-mode noises are canceled even if the polarity of the first bridge circuit groups Bp1-Bp4 is reversed (or not reversed) to that of the second bridge circuit groups Bn1-Bn4.

For this reason, calculation can be carried out in such a way that noises for all force components (Fx, Fy, Fz, Mx, My, and Mz) including force components in the X-axis and Y-axis directions (directions along a plane orthogonal to the direction of the external force P) are canceled, thereby improving the detection precision.

Figure 5A:
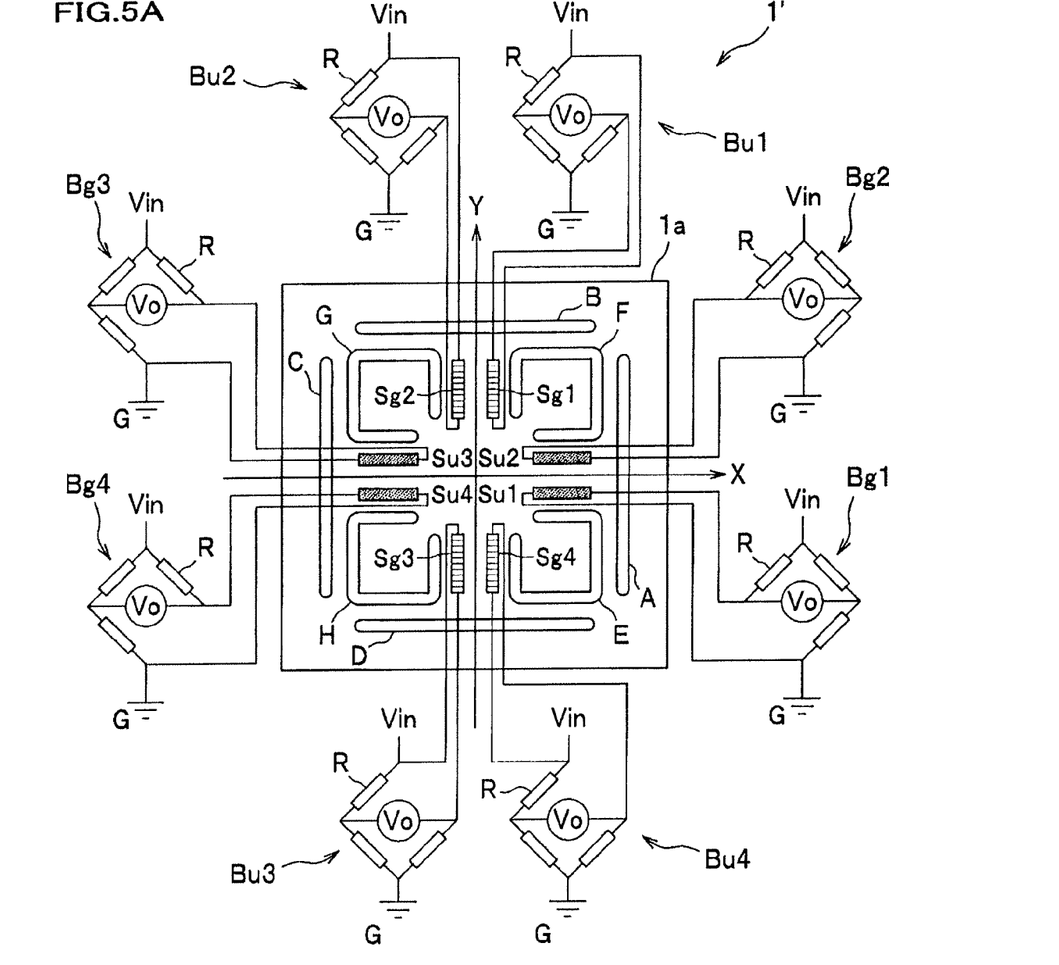
FIG. 5A is a plan view exemplary showing a relation between a strain resistance element and a bridge circuit in a multi-axis force sensor according to a second embodiment of the present invention.
Figures 5B, 5C:
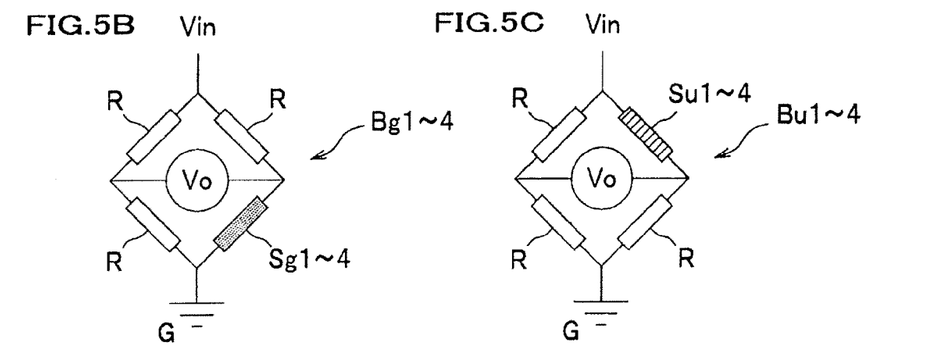
FIG. 5B is a circuit diagram showing a first bridge circuit.
FIG. 5C is a circuit diagram showing a second bridge circuit.

Next, with reference to FIG. 5, a multi-axis force sensor 1' according to a second embodiment of the present invention will be explained. In the following explanation, the difference from the multi-axis force sensor 1 of the first embodiment will be mainly explained, the same components will be denoted by the same reference numerals, and duplicated explanation thereof will be omitted.

The multi-axis force sensor 1' includes a first group of strain resistance elements Sg1-Sg4 and a second group of strain resistance elements Su1-Su4, all of which are composed of the same type semiconductor element (p-type or n-type semiconductor element S). The difference from the first embodiment is that the first group of the strain resistance elements Sg1-Sg4 are built in the ground side of first bridge circuit groups Bg1-Bg4 respectively (see FIG. 5B), and the second group of the strain resistance elements Su1-Su4 are built in the voltage input side of respective second bridge circuit groups Bu1-Bu4 respectively (see FIG. 5C).

According to such a structure, like the first embodiment, the first bridge circuit groups Bg1-Bg4 output a positive voltage respectively when the first group of strain resistance elements Sg1-Sg4 receive tensile force caused by the external force P, and the second bridge circuit groups Bu1-Bu4 output a negative voltage respectively when the second group of strain resistance elements Su1-Su4 receive tensile force caused by the external force P.

In addition, although the strain resistance elements Sp1-Sp4, and Sn1-Sn4 in the first embodiment are active layers (diffusion layers) formed on the surface (top layer part) of the semiconductor substrate 1a, the present invention is not limited to this configuration. The first and second groups of strain resistance elements Sg1-Sg4, and Su1-Su4 in the second embodiment may be so-called metallic strain gauges arranged on a base member which serves as a substrate.

Although the explanation has been given of the first and second embodiments of the present invention, the present invention is not limited to the foregoing embodiments, and can be changed and modified in various forms.

For example, although the explanation has been given of the case in which the present invention is applied to the multi-axis force sensors 1, 1' in the first and second embodiments, the present invention is not limited to the form of the multi-axis force sensor, and can be applied to an acceleration sensor which detects applied external force as an acceleration.

Figure 6:
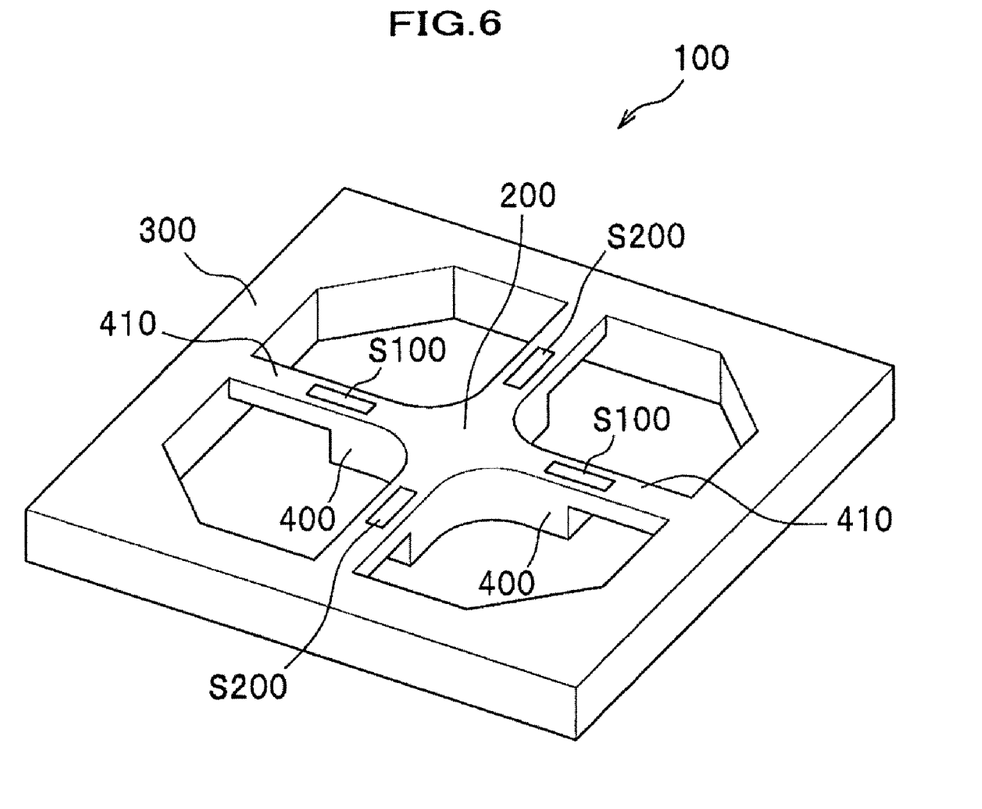
FIG. 6 is a perspective view for explaining a schematic structure of an acceleration sensor according to a modified embodiment of the present invention.

For example, as shown in FIG. 6, an acceleration sensor 100 according to a modified embodiment of the present invention includes an action portion 200 having a weight with a mass; a frame 300 which is fixed to an external structural body and supports the weight (action portion 200); a connection portion 400 which connects the action portion 200 to the frame 300; strain-generating portions 410 which are formed at the connection portion 400 and produce deformation originating from displacement of the weight; and a first group of strain resistance elements S100, S100 and a second group of strain resistance elements S200, S200.

Like the multi-axis force sensors 1, 1' of the present invention, the acceleration sensor 100 of the present invention measures three-axis components (Fx, Fy, and Fz) of an external force produced by an acceleration to be detected.

That is, the acceleration sensor 100 includes a first bridge circuit groups (not shown) which detect resistances of first group of strain resistance elements S100, S100 respectively and a second bridge circuit groups (not shown) which detect resistances of second group of strain resistance elements S200, S200 respectively. The first bridge circuit groups (not shown) output a positive voltage respectively when the first group of strain resistance elements S100, S100 receive tensile force originating from applied external force (acceleration), and output a negative voltage respectively when those strain resistance elements receive compressive force. The second bridge circuit groups (not shown) output a negative voltage respectively when the second group of strain resistance elements S200, S200 receive tensile force originating from applied external force, and output a positive voltage respectively when those strain resistance elements receive compressive force.

Also, in the foregoing first and second embodiments, although the multi-axis force sensor 1, 1' includes the action portion 2 provided at the center thereof, and includes the connection portions 4 and the support portion 3 outwardly of the action portion 2, the present invention is not limited to such a configuration. For example, the support portion may be provided at the center, the connection portion may be provided outwardly of the support portion, and the action portion may be provided outwardly of the connection portion. In other words, any configuration in which the connection portion can detect the external force P transmitted to the action portion by the strain resistance element S provided at the connection portion adjacent to the action portion and the support portion can support the connection portion and the action portion can be employed.

Also, in the foregoing first and second embodiments, although the multi-axis force sensors 1, 1' are formed in a substantially square shape, the shape thereof is not limited to this shape, and can be a rectangular shape or a circular shape. Also, the attenuator 9 may be a cube or a cuboid. The present invention can employ various forms regarding the shape of the multi-axis force sensors 1, 1' and that of the attenuator 9, and the combination thereof.

What is claimed is:

1. A multi-axis force sensor comprising:
   an action portion to which external force is applied;
   a support portion which supports the action portion;
   a connection portion which connects the support portion to the action portion;
   strain producing portions which are formed at the connection portion and which produce strain originating from the external force;
   a first group of strain resistance elements and a second group of strain resistance elements provided at the respective strain producing portions;
   first bridge circuit groups which detect respective resistances of the first group of strain resistance elements and second bridge circuit groups which detect respective resistances of the second group of strain resistance elements,
   wherein the strain producing portions are formed on two axes intersecting at right angle on the same plane,
   the first group of strain resistance elements are provided on one axis across the action portion so as to face with respect to each other, the second group of strain resistance elements are provided on another axis across the action portion so as to face with respect to each other,
   the first bridge circuit groups output a positive voltage respectively when the first group of strain resistance elements receive tensile force originating from the external force and output a negative voltage when the first group of strain resistance elements receive compressive force, and the second bridge circuit group output a negative voltage respectively when the second group of strain resistance elements receive tensile force and output a positive voltage when the second group of strain resistance elements receive compressive force.

2. The multi-axis force sensor according to claim 1, wherein the first group of strain resistance elements comprise a p-type semiconductor strain gauge respectively, and the second group of strain resistance elements comprise an n-type semiconductor strain gauge respectively.

3. The multi-axis force sensor according to claim 1, wherein the first group of strain resistance elements are built in ground sides of the first bridge circuit groups respectively, and the second group of strain resistance elements are built in voltage-input sides of the second bridge circuit groups respectively.

4. An acceleration sensor comprising:
   an action portion having a weight with a mass;
   a frame which is fixed to an external structural body and supports the weight;
   a connection portion which connects the action portion to the frame;
   strain-generating portions which are formed at the connection portions and produce deformation originating from displacement of the weight;
   a first group of strain resistance elements and a second group of strain resistance elements all of which are provided at the strain-generating portion; and
   first bridge circuit groups which detect respective resistances of the first group of strain resistance elements and second bridge circuit groups which detect respective resistances of the second group of strain resistance elements,
   wherein the strain-generating portions are formed on two axes intersecting at right angle on the same plane, the first group of strain resistance elements are provided on one axis across the action portion so as to face with respect to each other, the second group of strain resistance elements are provided on another axis across the action portion so as to face with respect to each other, the first bridge circuit groups output a positive voltage respectively when the first group of strain resistance elements receive tensile force originating from the external force and output a negative voltage when the first group of strain resistance elements receive compressive force, and the second bridge circuit group output a negative voltage respectively when the second group of strain resistance elements receive tensile force and output a positive voltage when the second group of strain resistance elements receive compressive force.

* * * * *